(12) United States Patent
Ohlin et al.

(10) Patent No.: US 12,623,555 B2
(45) Date of Patent: May 12, 2026

(54) COMPUTER SYSTEM AND A METHOD FOR CONTROLLING AN ELECTRIC PROPULSION SYSTEM OF AN AUTONOMOUS WORKING MACHINE

(71) Applicant: VOLVO CONSTRUCTION EQUIPMENT AB, Eskilstuna (SE)

(72) Inventors: Christian Ohlin, Rottne (SE); Per Mattsson, Sölvesborg (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 36 days.

(21) Appl. No.: 18/754,356

(22) Filed: Jun. 26, 2024

(65) Prior Publication Data

US 2025/0010729 A1     Jan. 9, 2025

(30) Foreign Application Priority Data

Jul. 7, 2023     (EP) ..................................... 23184182

(51) Int. Cl.
  *B60L 50/60*          (2019.01)
  *B60K 17/354*         (2006.01)
    (Continued)
(52) U.S. Cl.
  CPC ............ *B60L 50/60* (2019.02); *B60K 17/354* (2013.01); *B60K 17/356* (2013.01); *B60L 58/12* (2019.02);
    (Continued)
(58) Field of Classification Search
  None
  See application file for complete search history.

(56) References Cited

U.S. PATENT DOCUMENTS

2022/0371574 A1    11/2022   Chevalier et al.
2023/0161355 A1*    5/2023   Hita ........................ G05D 1/225
                                                                701/26

(Continued)

FOREIGN PATENT DOCUMENTS

EP          4190625 A1      6/2023
WO      2022194357 A1      9/2022

OTHER PUBLICATIONS

Extended European Search Report, European Application No. 23184182. 6, mailed Jan. 5, 2024, 9 pages.

*Primary Examiner* — Anshul Sood
*Assistant Examiner* — Wenyuan Yang
(74) *Attorney, Agent, or Firm* — Sage Patent Group

(57)     ABSTRACT

A computer system and a method for control of an electric propulsion system of an autonomous working machine including a first axle and a second axle, the electric propulsion system including a first electric system configured to drive the first axle, including a first electric energy storage system, and a second electric system configured to drive the second axle, including a second electric energy storage system. The method includes determining a longitudinal gradient along an expected travelling path, determining charge levels of the first and second electric energy storage systems, respectively, and controlling the working machine to assume a first orientation or a second orientation to travel along the expected travelling path, wherein the orientation of the working machine is controlled in dependence on the determined longitudinal gradient and the determined charge levels.

15 Claims, 3 Drawing Sheets

(51) Int. Cl.
     B60K 17/356      (2006.01)
     B60L 58/12      (2019.01)
     B60P 1/04      (2006.01)

(52) U.S. Cl.
     CPC ....... *B60L 2200/40* (2013.01); *B60L 2240/32*
       (2013.01); *B60L 2240/547* (2013.01); *B60L*
     *2240/642* (2013.01); *B60L 2260/28* (2013.01);
              *B60P 1/04* (2013.01)

(56)              References Cited

U.S. PATENT DOCUMENTS

2023/0170508 A1*  6/2023  Bulpitt ................. H01M 8/249
2024/0157805 A1*  5/2024  Larsson ................... B60T 1/10

* cited by examiner

COMPUTER SYSTEM AND A METHOD FOR CONTROLLING AN ELECTRIC PROPULSION SYSTEM OF AN AUTONOMOUS WORKING MACHINE

CROSS REFERENCE TO RELATED APPLICATIONS

This application claims priority to European Patent Application No. 23184182.6, filed on Jul. 7, 2023, the disclosure and content of which is incorporated by reference herein in its entirety.

TECHNICAL FIELD

The disclosure relates generally to control of electric propulsion systems in autonomous working machines. In particular aspects, the disclosure relates to a computer system and a method for controlling an electric propulsion system of an autonomous working machine. The disclosure can be applied to heavy-duty working machines and construction equipment, among other vehicle types. Although the disclosure may be described with respect to a particular working machine, the disclosure is not restricted to any particular working machine.

BACKGROUND

Heavy-duty electric working machines, such as electrically powered hauler vehicles and dump trucks, usually comprise more than one driven axle, such as two driven axles. Such working machines may either comprise a single electric system powering both axles, or separate electric systems, each powering one of the axles. A problem that may arise when separate electric systems are provided is that battery packs of the respective electric systems may discharge unevenly, i.e., battery packs used for powering a rear axle of the working machine may discharge more rapidly than battery packs used for powering a front axle. A charging stop may hence be necessary before the battery packs used for powering the front axle are fully discharged.

SUMMARY

According to a first aspect of the disclosure, a computer system comprising processing circuitry configured to control an electric propulsion system of an autonomous working machine comprising a first axle located near a first end of the working machine and a second axle located near a second end of the working machine is provided. The electric propulsion system comprises:
- a first electric system configured to drive the first axle, the first electric system comprising a first electric energy storage system and a first electric motor,
- a second electric system configured to drive the second axle, the second electric system comprising a second electric energy storage system and a second electric motor.

The processing circuitry is configured to:
- determine a longitudinal gradient along an expected travelling path of the working machine,
- determine charge levels of the first and second electric energy storage systems, respectively,
- control the working machine to assume a first orientation or a second orientation to travel along the expected travelling path, the first end of the working machine being a leading end in the first orientation, and the second end of the working machine being a leading end in the second orientation, wherein the orientation of the working machine is controlled in dependence on the determined longitudinal gradient and the determined charge levels.

The first aspect of the disclosure may seek to provide an in at least some aspect improved system for controlling an electric propulsion system comprising two separate electric systems configured to drive two separate axles. In particular, the first aspect may seek to provide such a system which may reduce problems with unbalanced charge levels between the respective energy storage systems of the two electric systems and which may hence increase the time between charging stops. By controlling the working machine to assume an orientation in dependence on the charge levels and the road gradient, the orientation may be selected to balance the charge levels between the energy storage systems. For an autonomous working machine, the orientation for travelling up or down a hill may hence be selected for charge balancing purposes. A technical benefit may include an improved total battery range of the working machine.

In some embodiments, including in at least one example, the processing circuitry is further configured to:
- detect an uphill road segment along the expected travelling path,
- in response to determining that the charge level of the first electric energy storage system exceeds the charge level of the second electric energy storage system by at least a first threshold amount, control the working machine to assume the second orientation prior to entering the detected uphill road segment, and
- in response to determining that the charge level of the second electric energy storage system exceeds the charge level of the first electric energy storage system by at least the first threshold amount, control the working machine to assume the first orientation prior to entering the detected uphill road segment.

Hence, an orientation of the working machine for travelling through the uphill road segment may be selected such that the energy storage system having the lowest charge level provides less electric power during the uphill travel than the energy storage system having the highest charge level. This may contribute to balancing of the charge levels. When it is determined that the charge levels of the energy storage systems differ by less than the first threshold amount, the working machine may be controlled to keep its present orientation. In this way, it can be ensured that a change of orientation is only initiated when it is considered useful.

In some embodiments, including in at least one example, the uphill road segment is a road segment over which a vertical height increases by at least a first threshold height. In this way, it can be ensured that a change of orientation is not initiated when the potential for balancing the charge levels is considered too low.

In some embodiments, including in at least one example, the first threshold height is set in dependence on a working machine weight in such a way that it decreases with increasing working machine weight. Hence, the larger the payload of the working machine, the less height difference is required for the road segment to be detected as an uphill road segment prior to which the working machine change its orientation.

In some embodiments, including in at least one example, the processing circuitry is configured to:
- detect a downhill road segment along the expected travelling path, in response to determining that the charge level of the first electric energy storage system exceeds the charge level of the second electric energy storage system by at least a second threshold amount, control the working machine to assume the second orientation prior to entering the detected downhill road segment, and in response to determining that the charge level of the second electric energy storage system exceeds the charge level of the first electric energy storage system by at least the second threshold amount, control the working machine to assume the first orientation prior to entering the detected downhill road segment.

Hence, an orientation of the working machine for travelling through the downhill road segment may be selected such that energy recuperated during travel along the downhill road segment is primarily used for charging of the energy storage system having the lowest charge level. This may contribute to balancing of the charge levels. When it is determined that the charge levels of the energy storage systems differ by less than the second threshold amount, the working machine may be controlled to keep its present orientation. In this way, it can be ensured that a change of orientation is only initiated when it is considered useful.

In some embodiments, including in at least one example, the downhill road segment is a road segment over which a vertical height decreases by at least a second threshold height. Optionally, the second threshold height is set in dependence on a working machine weight in such a way that it decreases with increasing working machine weight.

In some embodiments, including in at least one example, the processing circuitry is further configured to assess whether a predetermined condition for allowing the working machine to travel through the downhill road segment in the second orientation is fulfilled, wherein the processing circuitry is only configured to control the working machine to assume the second orientation if the predetermined condition is fulfilled. In this way, it can be avoided that the working machine travels through the downhill road segment in the second orientation if it is less suitable due to, e.g., a configuration of the working machine and a gradient of the road. This may be relevant, e.g., if the working machine comprises a tiltable body having a non-symmetric design. In those cases, it may be safer to travel through steep downhill road segments with the first end being a leading end to avoid dropping of payload if the working machine has to brake.

In some embodiments, including in at least one example, the predetermined condition is related to a working machine weight and/or to the longitudinal gradient within the downhill road segment.

In some embodiments, including in at least one example, the predetermined condition is considered fulfilled when the longitudinal gradient within the downhill road segment is lower than a threshold gradient, and/or when the longitudinal gradient is not expected to result in a working machine inclination above a threshold inclination, and/or when the working machine weight is below a threshold weight.

According to a second aspect of the disclosure, an autonomous working machine comprising or being communicatively connected to the computer system according to the first aspect is provided. The autonomous working machine comprises a first axle located near a first end of the working machine, a second axle located near a second end of the working machine, and an electric propulsion system comprising a first electric system configured to drive the first axle, the first electric system comprising a first electric energy storage system and a first electric motor, and a second electric system configured to drive the second axle, the second electric system comprising a second electric energy storage system and a second electric motor. The second aspect of the disclosure may seek to provide an in at least some aspect improved autonomous working machine of this type. In particular, it may seek to provide an autonomous working machine in which problems with unbalanced charge levels between the respective energy storage systems of the two electric systems may be reduced.

In some embodiments, including in at least one example, the working machine comprises a tiltable body configured to carry a payload, the tiltable body being pivotable about a transverse axis located at the second end of the working machine. Hence, the first end may correspond to a front end of the working machine, and the second end may correspond to a rear end.

According to a third aspect of the disclosure, a computer-implemented method for controlling an electric propulsion system of an autonomous working machine comprising a first axle located near a first end of the working machine and a second axle located near a second end of the working machine is provided. The electric propulsion system comprises:

a first electric system configured to drive the first axle, the first electric system comprising a first electric energy storage system and a first electric motor, a second electric system configured to drive the second axle, the second electric system comprising a second electric energy storage system and a second electric motor.

The method comprises:

by a processing circuitry of a computer system, determining a longitudinal gradient along an expected travelling path of the working machine, by the processing circuitry, determining charge levels of the first and second electric energy storage systems, respectively, by the processing circuitry, controlling the working machine to assume a first orientation or a second orientation to travel along the expected travelling path, the first end of the working machine being a leading end in the first orientation, and the second end of the working machine being a leading end in the second orientation, wherein the orientation of the working machine is controlled in dependence on the determined longitudinal gradient and the determined charge levels.

Advantages and effects of the third aspect of the disclosure are analogous to the advantages and effects of the first and second aspects of the disclosure, and vice versa.

In some embodiments, including in at least one example, the method comprises:

by the processing circuitry, detecting an uphill road segment along the expected travelling path, in response to determining that the charge level of the first electric energy storage system exceeds the charge level of the second electric energy storage system by at least a first threshold amount, controlling, by the processing circuitry, the working machine to assume the second orientation prior to entering the detected uphill road segment, and in response to determining that the charge level of the second electric energy storage system exceeds the charge level of the first electric energy storage system by at least the first threshold amount, controlling, by the processing circuitry the working machine to assume the first orientation prior to entering the detected uphill road segment.

In some embodiments, including in at least one example, detecting the uphill road segment comprises detecting a road segment over which a vertical height increases by at least a first threshold height.

In some embodiments, including in at least one example, the first threshold height is set in dependence on a working machine weight in such a way that it decreases with increasing working machine weight.

In some embodiments, including in at least one example, the method comprises:

by the processing circuitry, detecting a downhill road segment along the expected travelling path, in response to determining that the charge level of the first electric energy storage system exceeds the charge level of the second electric energy storage system by at least a second threshold amount, controlling, by the processing circuitry, the working machine to assume the second orientation prior to entering the downhill road segment, and in response to determining that the charge level of the second electric energy storage system exceeds the charge level of the first electric energy storage system by at least the second threshold amount, controlling, by the processing circuitry, the working machine to assume the first orientation prior to entering the detected downhill road segment.

In some embodiments, including in at least one example, detecting the downhill road segment comprises detecting a road segment over which a vertical height decreases by at least a second threshold height.

In some embodiments, including in at least one example, the method further comprises:

by the processing circuitry, assessing whether a predetermined condition for allowing the working machine to travel through the downhill road segment in the second orientation is fulfilled, wherein controlling the working machine to assume the second orientation is only performed if the predetermined condition is fulfilled.

In some embodiments, including in at least one example, the predetermined condition is related to a working machine payload and/or to the longitudinal gradient within the downhill road segment.

In some embodiments, including in at least one example, the predetermined condition is considered fulfilled when the longitudinal gradient within the downhill road segment is lower than a threshold gradient, and/or when the longitudinal gradient is not expected to result in a working machine inclination above a threshold inclination, and/or when the working machine weight is below a threshold weight.

According to a fourth aspect of the disclosure, there is provided a computer program product comprising program code for performing, when executed by the processing circuitry, the method of any of the examples of the third aspect of the disclosure.

According to a fifth aspect of the disclosure, there is provided a non-transitory computer-readable storage medium comprising instructions, which when executed by the processing circuitry, cause the processing circuitry to perform the method of any of the examples of the third aspect of the disclosure.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

An electrically powered working machine may comprise two electric systems, each powering one driven axle of the working machine, such as a front axle and a rear axle. Each electric system comprises its own electric energy storage system, which may be charged at an electric charging station and in which energy recuperated during, e.g., downhill travel may be stored. Since front and rear axle propulsion and energy recuperation do not necessarily follow each other, there will over time build up a difference in charge levels for the front and the rear electric energy storage systems, even when the charge levels were equal after charging at the charging station. Typical occasions that build up such a difference in charge levels are driving uphill or downhill with poor traction. In these cases, tractive force must be distributed according to the normal force distribution to utilize the available friction. Accordingly, more power is consumed by the rear axle propulsion system when driving uphill and more power is recuperated by the front axle propulsion system when driving downhill. This will drain the rear axle electric energy storage system and lead to a charging stop before the charge level of the front axle electric energy storage system is low.

With separate electric systems, it is normally not possible to transfer electric power from one of the electric energy storage systems to the other when the charge levels begin to differ from one another. Instead, when one of the electric energy storage systems is depleted, a charging stop is necessary, even if the other electric energy storage system still has available electric power.

To reduce downtime, it is desirable to provide a method and a system that contribute to balancing of the charge levels of the two electric energy storage systems.

Figure 1:
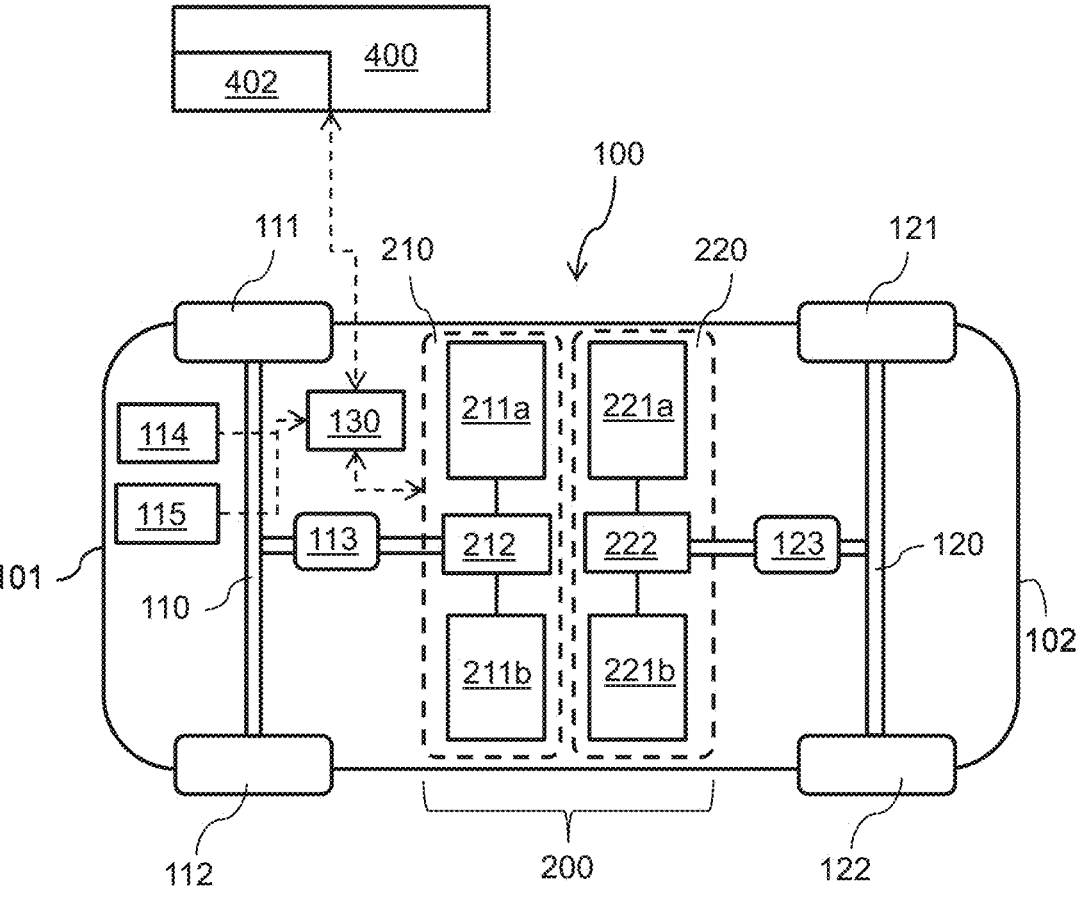
FIG. 1 is a schematic overview of an autonomous working machine and a computer system according to an example.

FIG. 1 schematically illustrates an autonomous working machine 100 being communicatively connected to a computer system 400 according to an example of the disclosure. The working machine 100 comprises a first axle 110 located near a first end 101 of the working machine 100 and a second axle 120 located near a second end 102 of the working machine 100. A first pair of driven wheels 111, 112 are provided on the first axle 110, and a second pair of driven wheels 121, 122 are provided on the second axle 120. The working machine 100 further comprises an electric propulsion system 200 for providing propulsion power to the working machine 100. The electric propulsion system 200 comprises a first electric system 210 configured to drive the first axle 110, and a second electric system 220 configured to drive the second axle 120. The first electric system 210 comprises a first electric energy storage system, herein comprising two first battery packs 211*a*, 211*b*, and a first electric motor 212. The second electric system 220 comprises a second electric energy storage system, herein comprising two second battery packs 221*a*, 221*b*, and a second electric motor 222. The first electric motor 212 is connected to the first axle 110 via a first transmission 113 and the second electric motor 222 is connected to the second axle 120 via a second transmission 123. The first and second electric motors 212, 222 are in the form of motor-generators, which consume electric power when working as motors and which generate electric power in a regenerative operation mode.

Although the first and second electric systems 210, 220 are herein illustrated with one electric motor 212, 222 per electric system, each electric system may in other examples according to the disclosure comprise more than one electric motor, such as two or more electric motors per electric system. Similarly, each electric system may comprise another number of battery packs, such as one, three or four battery packs per electric system. According to one example, each electric system may comprise four battery packs and two electric motors.

The computer system 400 comprises a processing circuitry 402 and may be located on-board or off-board the working machine 100. For example, the computer system 400 may be a central server or a cloud server and arranged to communicate with an on-board control unit 130 of the working machine 100. The communicative contact between the computer system 400 and the control unit 130 of the working machine 100, indicated by a dashed arrow, may be in the form of wireless communication, such as by use of WiFi, Bluetooth, telecommunication, etc. The on-board control unit 130 may in turn be configured to communicate with different systems of the working machine 100, such as with the first and second electric systems 210, 220.

Figure 2:
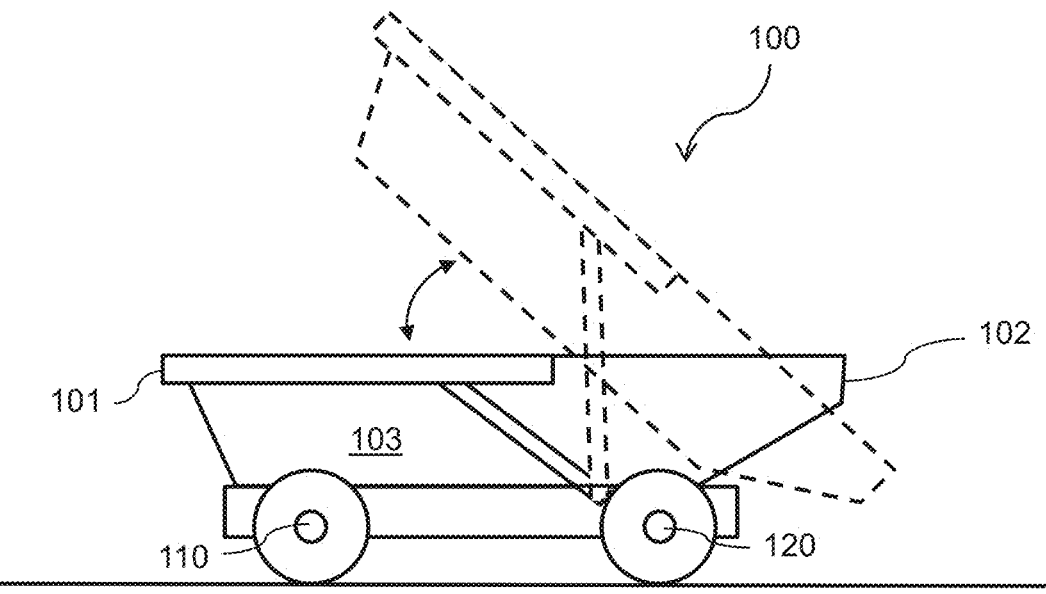
FIG. 2 is a schematic side view of an autonomous working machine according to an example.

The autonomous working machine 100 illustrated in FIG. 1 may, e.g., have a configuration such as schematically illustrated in FIG. 2. Hence, the working machine 100 may comprise a tiltable body 103 configured to carry a payload. The tiltable body 103 may be pivotable about a transverse axis (not shown) located at the second end 102 of the working machine 100. The transverse axis is herein parallel to the first and second axles 110, 120.

The working machine 100 may be configured for operation in a confined area, such as in a working site, a quarry, a mine, or similar. A site system of the confined area may be available to the computer system 400. The site system may comprise a map of the confined area, including a topographic map from which road gradients along known travelling paths for the working machine 100 are known. The computer system 400 may be configured to plan a travelling path of the working machine 100 based on information provided from the site system. The working machine 100 may further comprise at least one sensor 114 for identifying a position of the working machine 100 in the confined area. The sensor 114 may for example be a GNSS (global navigation satellite system) sensor. The sensor 114 may be configured to communicate the coordinates of the working machine 100 to the computer system 400. Additionally, or alternatively, other sensors may be used for localizing the working machine 100 in the confined area, such as by use of environment perception sensors.

The working machine 100 may furthermore comprise at least one sensor 115 for detecting a weight of the working machine 100 and/or of a load provided on the working machine 100, i.e., material loaded on the working machine 100. The sensor 115 may for example be a weight sensor which measures a weight of the load. Alternatively, by using pressure sensors, the sprung weight of the working machine may be calculated from measured pressures in a hydraulic suspension system. Furthermore, a camera or similar identifying material loaded onto the working machine 100 may be provided. Data from the sensor 115 may be communicated to the computer system 400.

The working machine 100 may furthermore comprise at least one sensor (not shown) by means of which a present orientation of the working machine may be determined. The sensor may, e.g., be a rotational speed sensor configured to sense rotational speed of any one of the wheels 111, 112, 121, 122 of the working machine 100.

Figure 3:
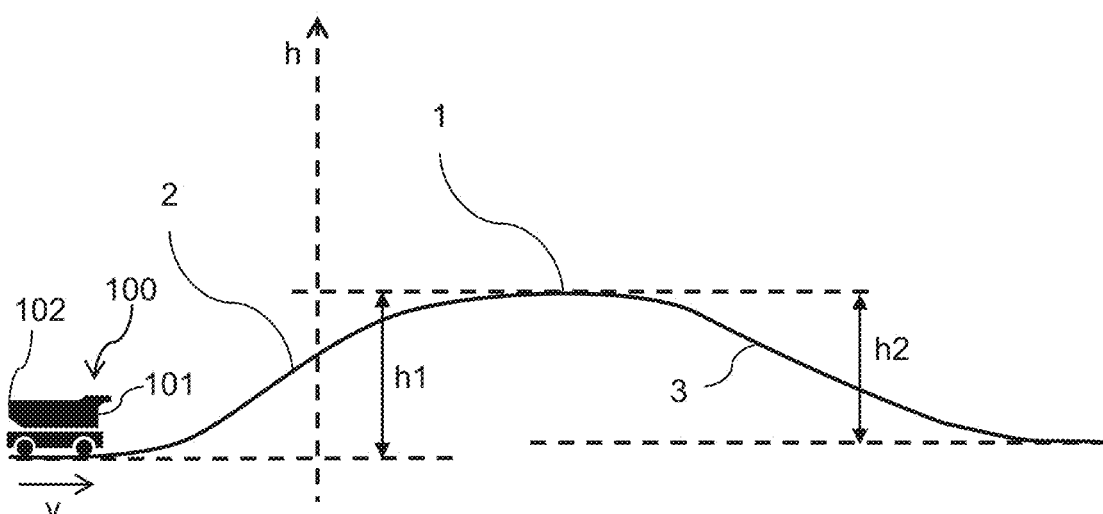
FIG. 3 schematically illustrates an autonomous working machine about to travel up a hill.

FIG. 3 illustrates an autonomous working machine 100, such as the working machine 100 illustrated in FIGS. 1 and/or 2, which is about to travel through an expected travelling path 1 comprising an uphill road segment 2 followed by a downhill road segment 3. The working machine 100 is positioned such that its first end 101 is a leading end.

The processing circuitry 402 is configured to determine a longitudinal gradient along the expected travelling path 1 of the working machine 100, i.e., the gradient of the ground surface in a direction of travel v of the working machine 100. For example, it may use the data provided from the sensor 114 to localize the working machine 100 within the confined area and based on the position and on the map of the confined area determine the gradient along the expected travelling path 1.

The processing circuitry 402 is further configured to determine charge levels of the first and second electric energy storage systems, respectively, i.e., of the first battery packs 211*a*, 211*b* and of the second battery packs 221*a*, 221*b*. The charge level may herein be understood as a state-of-charge (SoC) of the respective electric energy storage system. The charge levels may be determined based on data communicated from the battery packs 211*a*, 211*b*, 221*a*, 221*b*.

The processing circuitry 402 is further configured to control the working machine 100 to assume a first orientation or a second orientation to travel along the expected travelling path. In the first orientation, as illustrated in FIG. 3, the first end 101 of the working machine 100 is the leading end, and in the second orientation, the second end 102 of the working machine 100 is the leading end. The orientation of the working machine 100 is controlled in dependence on the determined longitudinal gradient and the determined charge levels.

In one example, an uphill road segment 2 may be detected along the expected travelling path 1, such as a road segment over which a vertical height h increases by at least a first threshold height h1. Furthermore, it may be determined that the charge level of the first electric energy storage system 211*a*, 211*b* exceeds the charge level of the second electric energy storage system 221*a*, 221*b* by at least a first threshold amount. In response thereto, the processing circuitry 402 may control the working machine 100 to assume the second orientation prior to entering the detected uphill road segment 2. In other words, the working machine 100 may travel up the uphill road segment 2 in the second orientation, with the second end 102 being the leading end. The first electric motor 212, driving the first axle 110 which is located at a lower level than the second axle 120 during the climb, will hence consume more electric power during the climb than the second electric motor 222. This may contribute to balancing the charge levels, since the charge level of the first electric energy storage system 211a, 211b will decrease more rapidly than the charge level of the second electric energy storage system 221a, 221b.

Correspondingly, if it is determined that the charge level of the second electric energy storage system 221a, 221b exceeds the charge level of the first electric energy storage system 211a, 211b by at least the first threshold amount, the processing circuitry 402 may control the working machine 100 to assume the first orientation prior to entering the detected uphill road segment 2.

If the difference between the charge levels of the first electric energy storage system 211a, 211b and the second electric energy storage system 221a, 221b is smaller than the first threshold amount, the working machine 100 may be controlled to climb the detected uphill road segment 2 without changing its orientation prior to the climb.

The first threshold height h1 may be set in dependence on a working machine weight, i.e., a weight of the working machine 100, in such a way that it decreases with increasing working machine weight. If the working machine 100 is relatively light, a relatively large change in vertical height h is thereby required to change orientation of the working machine 100, while for a relatively heavy working machine 100, a relatively small change in vertical height h is required to change orientation. The heavier the working machine 100 is, the larger is the difference between the electric power consumed by the foremost electric motor and the rearmost electric motor.

In another example, a downhill road segment 3 may be detected along the expected travelling path 1, such as a road segment over which the vertical height h decreases by at least a second threshold height h2. Furthermore, it may be determined that the charge level of the first electric energy storage system 211a, 211b exceeds the charge level of the second electric energy storage system 221a, 221b by at least a second threshold amount. In response thereto, the processing circuitry 402 may control the working machine 100 to assume the second orientation prior to entering the detected downhill road segment 3. In other words, the working machine 100 may travel down the downhill road segment 3 in the second orientation, with the second end 102 being the leading end. The first electric motor 212, connected to the first axle 110 which is located at a higher level than the second axle 120 during the descent, will hence generate less electric power during the descent than the second electric motor 222. This may contribute to balancing the charge levels, since the charge level of the first electric energy storage system 211a, 211b will increase more slowly than the charge level of the second electric energy storage system 221a, 221b.

Correspondingly, if it is determined that the charge level of the second electric energy storage system 221a, 221b exceeds the charge level of the first electric energy storage system 211a, 211b by at least the second threshold amount, the processing circuitry 402 may control the working machine 100 to assume the first orientation prior to entering the detected downhill road segment 3.

If the difference between the charge levels of the first electric energy storage system 211a, 211b and the second electric energy storage system 221a, 221b is smaller than the second threshold amount, the working machine 100 may be controlled to descend the detected downhill road segment 3 without changing its orientation prior to the descent. The second threshold amount may be equal to the first threshold amount, or it may differ from the first threshold amount.

Similar to the first threshold height h1, the second threshold height h2 may be set in dependence on a working machine weight in such a way that it decreases with increasing working machine weight. The first and second threshold heights may or may not be identical.

The processing circuitry 402 may further be configured to assess whether a first predetermined condition for allowing the working machine 100 to travel through the downhill road segment 3 in the second orientation is fulfilled. If the first predetermined condition is fulfilled, the working machine 100 may be controlled to assume the second orientation. In this example, if the first predetermined condition is not fulfilled, the working machine 100 will not be allowed to descend the downhill road segment 3 in the second orientation. The first predetermined condition may be related to the working machine weight and/or to the longitudinal gradient within the downhill road segment 3. For example, the first predetermined condition may be considered fulfilled when the longitudinal gradient within the downhill road segment 3 is lower than a threshold gradient, and/or when the longitudinal gradient is not expected to result in a longitudinal inclination of the working machine 100 above a threshold inclination, and/or when the working machine weight is below a threshold weight. By setting such a condition, situations in which a heavily loaded working machine 100 descends in an unsuitable orientation may be avoided. For example, when the working machine 100 comprises a tiltable body 103 as illustrated in FIG. 2, material loaded on the tiltable body 103 may fall off the body during the descent in the event of a sudden braking of the working machine 100, depending on a configuration of the tiltable body 103. Hence, it may be more suitable for the working machine 100 to travel downhill in the first orientation.

Similarly, when the uphill road segment 2 is detected, the processing circuitry 402 may further be configured to assess whether a second predetermined condition for allowing the working machine 100 to travel through the uphill road segment 2 in the first orientation is fulfilled. If the second predetermined condition is fulfilled, the working machine 100 may be controlled to assume the first orientation. In this example, if the second predetermined condition is not fulfilled, the working machine 100 will not be allowed to ascend the uphill road segment 2 in the first orientation. The second predetermined condition may be set to avoid dropping of payload in connection with acceleration of the working machine in the travelling direction during the uphill travel. The second predetermined condition may hence be related to the working machine weight and/or to the longitudinal gradient within the uphill road segment 2. In comparison with downhill travel, the risk of dropping payload is generally lower during uphill travel since the magnitude of the acceleration is typically lower than the magnitude of the deceleration in a sudden braking event during downhill travel. Consequently, the second predetermined condition may be set to allow steeper gradients and larger payloads than the first predetermined condition for downhill travel.

Figure 4:
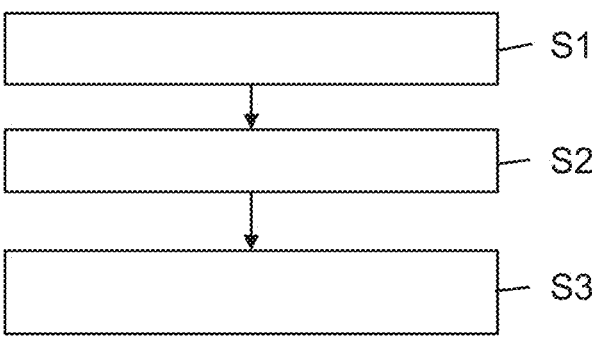
FIG. 4 is a flowchart illustrating a method according to an example.

FIG. 4 schematically illustrates a computer-implemented method for controlling the electric propulsion system 200 of an autonomous working machine 100, such as the working machine illustrated in any one of FIGS. 1-3. The method comprises the following actions, which may be taken in any suitable order:

S1: By a processing circuitry 402 of a computer system 400, determining a longitudinal gradient along an expected travelling path 1 of the working machine 100.

S2: By the processing circuitry 402, determining charge levels of the first and second electric energy storage systems 211a, 211b, 221a, 221b, respectively.

S3: By the processing circuitry 402, controlling the working machine 100 to assume a first orientation or a second orientation to travel along the expected travelling path 1, the first end 101 of the working machine 100 being a leading end in the first orientation, and the second end 102 of the working machine 100 being a leading end in the second orientation, wherein the orientation of the working machine 100 is controlled in dependence on the determined longitudinal gradient and the determined charge levels.

The method may comprise, by the processing circuitry 402, detecting an uphill road segment 2 along the expected travelling path 1. In response to determining that the charge level of the first electric energy storage system 211a, 211b exceeds the charge level of the second electric energy storage system 221a, 221b by at least a first threshold amount, the method may comprise controlling, by the processing circuitry 402, the working machine 100 to assume the second orientation prior to entering the detected uphill road segment 2. In response to determining that the charge level of the second electric energy storage system 221a, 221b exceeds the charge level of the first electric energy storage system 211a, 211b by at least the first threshold amount, the method may comprise controlling, by the processing circuitry 402, the working machine 100 to assume the first orientation prior to entering the detected uphill road segment 2.

The method may further comprise, by the processing circuitry 402, detecting a downhill road segment 3 along the expected travelling path. In response to determining that the charge level of the first electric energy storage system 211a, 211b exceeds the charge level of the second electric energy storage system 221a, 221b by at least a second threshold amount, the method may comprise controlling, by the processing circuitry 402, the working machine 100 to assume the second orientation prior to entering the downhill road segment 3. In response to determining that the charge level of the second electric energy storage system 221a, 221b exceeds the charge level of the first electric energy storage system 211a, 211b by at least the second threshold amount, the method may comprise controlling, by the processing circuitry 402, the working machine 100 to assume the first orientation prior to entering the detected downhill road segment 3.

The method may further comprise, by the processing circuitry 402, assessing whether a first predetermined condition for allowing the working machine 100 to travel through the downhill road segment 3 in the second orientation is fulfilled, wherein controlling the working machine 100 to assume the second orientation is only performed if the first predetermined condition is fulfilled.

Similarly, when the uphill road segment 2 has been detected along the expected travelling path, it may further comprise, by the processing circuitry 402, assessing whether a second predetermined condition for allowing the working machine 100 to travel through the uphill road segment 2 in the first orientation is fulfilled, wherein controlling the working machine 100 to assume the first orientation is only performed if the second predetermined condition is fulfilled.

Figure 5:
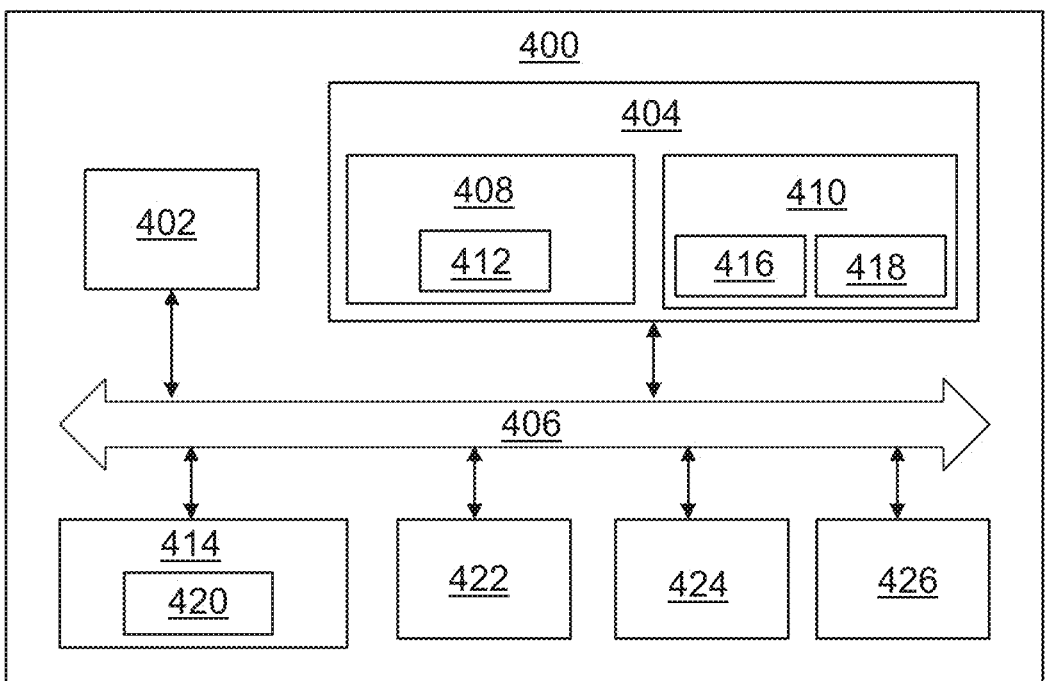
FIG. 5 is a schematic diagram of an exemplary computer system for implementing examples disclosed herein, according to an example.

FIG. 5 is a schematic diagram of a computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include processing circuitry 402 (e.g., processing circuitry including one or more processor devices or control units), a memory 404, and a system bus 406. The computer system 400 may include at least one computing device having the processing circuitry 402. The system bus 406 provides an interface for system components including, but not limited to, the memory 404 and the processing circuitry 402. The processing circuitry 402 may include any number of hardware components for conducting data or signal processing or for executing computer code stored in memory 404. The processing circuitry 402 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 402 may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processing circuitry 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with processing circuitry 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program 420 stored on a transitory or non-transitory computer-usable or computer-readable storage medium (e.g., single medium or multiple media), such as the storage device 414, which includes complex programming instructions (e.g., complex computer-readable program code) to cause the processing circuitry 402 to carry out actions described herein. Thus, the computer-readable program code of the computer program 420 can comprise software instructions for implementing the functionality of the examples described herein when executed by the processing circuitry 402. In some examples, the storage device 414 may be a computer program product (e.g., readable storage medium) storing the computer program 420 thereon, where at least a portion of a computer program 420 may be loadable (e.g., into a processor) for implementing the functionality of the examples described herein when executed by the processing circuitry 402. The processing circuitry 402 may serve as a controller or control system for the computer system 400 that is to implement the functionality described herein.

The computer system 400 may include an input device interface 422 configured to receive input and selections to be communicated to the computer system 400 when executing instructions, such as from a keyboard, mouse, touch-sensitive surface, etc. Such input devices may be connected to the processing circuitry 402 through the input device interface 422 coupled to the system bus 406 but can be connected through other interfaces, such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may include a communications interface 426 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

In the following, possible features and feature combinations of the disclosure are presented as a list of numbered examples.

Example 1. A computer system (400) comprising processing circuitry (402) configured to control an electric propulsion system (200) of an autonomous working machine (100) comprising a first axle (110) located near a first end (101) of the working machine (100) and a second axle (120) located near a second end (102) of the working machine (100), the electric propulsion system (200) comprising:

a first electric system (210) configured to drive the first axle (110), the first electric system (210) comprising a first electric energy storage system (211a, 211b) and a first electric motor (212), a second electric system (220) configured to drive the second axle (120), the second electric system (220) comprising a second electric energy storage system (221a, 221b) and a second electric motor (222), the processing circuitry (402) being configured to:

determine a longitudinal gradient along an expected travelling path (1) of the working machine (100), determine charge levels of the first and second electric energy storage systems (211a, 211b, 221a, 221b), respectively, control the working machine (100) to assume a first orientation or a second orientation to travel along the expected travelling path (1), the first end (101) of the working machine (100) being a leading end in the first orientation, and the second end (102) of the working machine (100) being a leading end in the second orientation, wherein the orientation of the working machine (100) is controlled in dependence on the determined longitudinal gradient and the determined charge levels.

Example 2. The computer system of example 1, wherein the processing circuitry (402) is further configured to:

detect an uphill road segment (2) along the expected travelling path (1), in response to determining that the charge level of the first electric energy storage system (211a, 211b) exceeds the charge level of the second electric energy storage system (221a, 221b) by at least a first threshold amount, control the working machine (100) to assume the second orientation prior to entering the detected uphill road segment (2), and in response to determining that the charge level of the second electric energy storage system (221a, 221b) exceeds the charge level of the first electric energy storage system (211a, 211b) by at least the first threshold amount, control the working machine (100) to assume the first orientation prior to entering the detected uphill road segment (2).

Example 3. The computer system of example 2, wherein the uphill road segment (2) is a road segment over which a vertical height (h) increases by at least a first threshold height (h1).

Example 4. The computer system of example 3, wherein the first threshold height (h1) is set in dependence on a working machine weight in such a way that it decreases with increasing working machine weight.

Example 5. The computer system of any of the preceding examples, wherein the processing circuitry (402) is configured to:

detect a downhill road segment (3) along the expected travelling path (1), in response to determining that the charge level of the first electric energy storage system (211a, 211b) exceeds the charge level of the second electric energy storage system (221a, 221b) by at least a second threshold amount, control the working machine (100) to assume the second orientation prior to entering the detected downhill road segment (3), and in response to determining that the charge level of the second electric energy storage system (221a, 221b) exceeds the charge level of the first electric energy storage system (211a, 211b) by at least the second threshold amount, control the working machine (100) to assume the first orientation prior to entering the detected downhill road segment (3).

Example 6. The computer system of example 5, wherein the downhill road segment (3) is a road segment over which a vertical height (h) decreases by at least a second threshold height (h2), wherein the second threshold height (h2) may be set in dependence on a working machine weight in such a way that it decreases with increasing working machine weight.

Example 7. The computer system of example 5 or 6, wherein the processing circuitry (402) is further configured to:

assess whether a predetermined condition for allowing the working machine (100) to travel through the downhill road segment (3) in the second orientation is fulfilled, wherein the processing circuitry (402) is only configured to control the working machine (100) to assume the second orientation if the predetermined condition is fulfilled.

Example 8. The computer system of example 7, wherein the predetermined condition is related to a working machine weight and/or to the longitudinal gradient within the downhill road segment.

Example 9. The computer system of example 7 or 8, wherein the predetermined condition is considered fulfilled when the longitudinal gradient within the downhill road segment (3) is lower than a threshold gradient, and/or when the longitudinal gradient is not expected to result in a working machine inclination above a threshold inclination, and/or when the working machine weight is below a threshold weight.

Example 10. An autonomous working machine (100) comprising or being communicatively connected to the computer system (400) of any of examples 1-9.

Example 11. The working machine of example 10, wherein the working machine (100) comprises a tiltable body (103) configured to carry a payload, the tiltable body (103) being pivotable about a transverse axis located at the second end (102) of the working machine (100).

Example 12. A computer-implemented method for controlling an electric propulsion system (200) of an autonomous working machine (100) comprising a first axle (110) located near a first end (101) of the working machine (100) and a second axle (120) located near a second end (102) of the working machine (100), the electric propulsion system (200) comprising:

a first electric system (210) configured to drive the first axle (110), the first electric system (210) comprising a first electric energy storage system (211a, 211b) and a first electric motor (212), a second electric system (220) configured to drive the second axle (120), the second electric system (220) comprising a second electric energy storage system (221a, 221b) and a second electric motor (222), the method comprising:

by a processing circuitry (402) of a computer system (400), determining (S1) a longitudinal gradient along an expected travelling path (1) of the working machine (100), by the processing circuitry (402), determining (S2) charge levels of the first and second electric energy storage systems (211a, 211b, 221a, 221b), respectively, by the processing circuitry (402), controlling (S3) the working machine (100) to assume a first orientation or a second orientation to travel along the expected travelling path (1), the first end (101) of the working machine (100) being a leading end in the first orientation, and the second end (102) of the working machine (100) being a leading end in the second orientation, wherein the orientation of the working machine (100) is controlled in dependence on the determined longitudinal gradient and the determined charge levels.

Example 13. The method of example 12, comprising:

by the processing circuitry (402), detecting an uphill road segment (2) along the expected travelling path (1), in response to determining that the charge level of the first electric energy storage system (211a, 211b) exceeds the charge level of the second electric energy storage system (221a, 221b) by at least a first threshold amount, controlling, by the processing circuitry (402), the working machine (100) to assume the second orientation prior to entering the detected uphill road segment (2), and in response to determining that the charge level of the second electric energy storage system (221a, 221b) exceeds the charge level of the first electric energy storage system (211a, 211b) by at least the first threshold amount, controlling, by the processing circuitry (402) the working machine (100) to assume the first orientation prior to entering the detected uphill road segment (2).

Example 14. The method of example 13, wherein detecting the uphill road segment (2) comprises detecting a road segment over which a vertical height (h) increases by at least a first threshold height (h1).

Example 15. The method of example 14, wherein the first threshold height (h1) is set in dependence on a working machine weight in such a way that it decreases with increasing working machine weight.

Example 16. The method of any of examples 12-15, comprising:

by the processing circuitry (402), detecting a downhill road segment (3) along the expected travelling path (1), in response to determining that the charge level of the first electric energy storage system (211a, 211b) exceeds the charge level of the second electric energy storage system (221a, 221b) by at least a second threshold amount, controlling, by the processing circuitry (402), the working machine (100)

to assume the second orientation prior to entering the downhill road segment (3), and in response to determining that the charge level of the second electric energy storage system (221a, 221b) exceeds the charge level of the first electric energy storage system (211a, 211b) by at least the second threshold amount, controlling, by the processing circuitry (402), the working machine (100) to assume the first orientation prior to entering the detected downhill road segment (3).

Example 17. The method of example 16, wherein detecting the downhill road segment (3) comprises detecting a road segment over which a vertical height (h) decreases by at least a second threshold height (h2).

Example 18. The method of example 16 or 17, further comprising:

by the processing circuitry (402), assessing whether a predetermined condition for allowing the working machine (100) to travel through the downhill road segment (3) in the second orientation is fulfilled, wherein controlling the working machine (100) to assume the second orientation is only performed if the predetermined condition is fulfilled.

Example 19. The method of example 18, wherein the predetermined condition is related to a working machine payload and/or to the longitudinal gradient within the downhill road segment (3).

Example 20. The method of example 18 or 19, wherein the predetermined condition is considered fulfilled when the longitudinal gradient within the downhill road segment (3) is lower than a threshold gradient, and/or when the longitudinal gradient is not expected to result in a working machine inclination above a threshold inclination, and/or when the working machine weight is below a threshold weight.

Example 21. A computer program product comprising program code for performing, when executed by the processing circuitry (402), the method of any of examples 12-20.

Example 22. A non-transitory computer-readable storage medium comprising instructions, which when executed by the processing circuitry (402), cause the processing circuitry to perform the method of any of examples 12-20.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to control an electric propulsion system of an autonomous working machine comprising a first axle located near a first end of the working machine and a second axle located near a second end of the working machine, the electric propulsion system comprising:

a first electric system configured to drive the first axle, the first electric system comprising a first electric energy storage system and a first electric motor, and a second electric system configured to drive the second axle, the second electric system comprising a second electric energy storage system and a second electric motor, the processing circuitry being configured to:

determine a longitudinal gradient along an expected travelling path of the working machine, determine charge levels of the first and second electric energy storage systems, respectively, and control the working machine to assume a first orientation or a second orientation to travel along the expected travelling path, the first end of the working machine being a leading end in the first orientation, and the second end of the working machine being a leading end in the second orientation, wherein the orientation of the working machine is controlled in dependence on the determined longitudinal gradient and the determined charge levels.

2. The computer system of claim 1, wherein the processing circuitry is further configured to:

detect an uphill road segment along the expected travelling path, in response to determining that the charge level of the first electric energy storage system exceeds the charge level of the second electric energy storage system by at least a first threshold amount, control the working machine to assume the second orientation prior to entering the detected uphill road segment, and in response to determining that the charge level of the second electric energy storage system exceeds the charge level of the first electric energy storage system by at least the first threshold amount, control the working machine to assume the first orientation prior to entering the detected uphill road segment.

3. The computer system of claim 2, wherein the uphill road segment is a road segment over which a vertical height increases by at least a first threshold height.

4. The computer system of claim 3, wherein the first threshold height is set in dependence on a working machine weight in such a way that it decreases with increasing working machine weight.

5. The computer system of claim 1, wherein the processing circuitry is configured to:

detect a downhill road segment along the expected travelling path, in response to determining that the charge level of the first electric energy storage system exceeds the charge level of the second electric energy storage system by at least a second threshold amount, control the working machine to assume the second orientation prior to entering the detected downhill road segment, and in response to determining that the charge level of the second electric energy storage system exceeds the charge level of the first electric energy storage system by at least the second threshold amount, control the working machine to assume the first orientation prior to entering the detected downhill road segment.

6. The computer system of claim 5, wherein the downhill road segment is a road segment over which a vertical height decreases by at least a second threshold height, wherein the second threshold height is set in dependence on a working machine weight in such a way that it decreases with increasing working machine weight.

7. The computer system of claim 5, wherein the processing circuitry is further configured to:

assess whether a predetermined condition for allowing the working machine to travel through the downhill road segment in the second orientation is fulfilled, wherein the processing circuitry is only configured to control the working machine to assume the second orientation if the predetermined condition is fulfilled.

8. The computer system of claim 7, wherein the predetermined condition is related to a working machine weight and/or to the longitudinal gradient within the downhill road segment.

9. The computer system of claim 7, wherein the predetermined condition is considered fulfilled when the longitudinal gradient within the downhill road segment is lower than a threshold gradient, and/or when the longitudinal gradient is not expected to result in a working machine inclination above a threshold inclination, and/or when the working machine weight is below a threshold weight.

10. An autonomous working machine comprising or being communicatively connected to the computer system of claim 1.

11. The autonomous working machine of claim 10, wherein the working machine comprises a tiltable body configured to carry a payload, the tiltable body being pivotable about a transverse axis located at the second end of the working machine.

12. A computer-implemented method for controlling an electric propulsion system of an autonomous working machine comprising a first axle located near a first end of the working machine and a second axle located near a second end of the working machine, the electric propulsion system comprising:

a first electric system configured to drive the first axle, the first electric system comprising a first electric energy storage system and a first electric motor, and a second electric system configured to drive the second axle, the second electric system comprising a second electric energy storage system and a second electric motor, the method comprising:

by a processing circuitry of a computer system, determining a longitudinal gradient along an expected travelling path of the working machine, by the processing circuitry, determining charge levels of the first and second electric energy storage systems, respectively, and by the processing circuitry, controlling the working machine to assume a first orientation or a second orientation to travel along the expected travelling path, the first end of the working machine being a leading end in the first orientation, and the second end of the working machine being a leading end in the second orientation, wherein the orientation of the working machine is controlled in dependence on the determined longitudinal gradient and the determined charge levels.

13. The method of claim 12, comprising:

by the processing circuitry, detecting an uphill road segment along the expected travelling path, in response to determining that the charge level of the first electric energy storage system exceeds the charge level of the second electric energy storage system by at least a first threshold amount, controlling, by the processing circuitry, the working machine to assume the second orientation prior to entering the detected uphill road segment, and in response to determining that the charge level of the second electric energy storage system exceeds the charge level of the first electric energy storage system by at least the first threshold amount, controlling, by the processing circuitry the working machine to assume the first orientation prior to entering the detected uphill road segment.

14. A non-transitory computer-readable storage medium comprising program code for performing, when executed by the processing circuitry, the method of claim 12.

15. A non-transitory computer-readable storage medium comprising instructions, which when executed by the processing circuitry, cause the processing circuitry to perform the method of claim 12.

* * * * *